United States Patent [19]
Werenicz et al.

[11] Patent Number: 5,851,661
[45] Date of Patent: Dec. 22, 1998

[54] WATER VAPOR PERMEABLE FILM

[75] Inventors: Harald Werenicz, Rippenstedt; Franz Maitz, Bruckmuhl, both of Germany; Walter Nussbaumer, Alumunster, Austria; Ludwig Stingl, Munich; Franz Peter Schmitz, Vaterstetten, both of Germany

[73] Assignee: H.B. Fuller Licensing & Financing, Inc., St. Paul, Minn.

[21] Appl. No.: 420,660

[22] Filed: Apr. 12, 1995

Related U.S. Application Data

[62] Division of Ser. No. 906,807, Jun. 30, 1992, Pat. No. 5,508,371.

[30] Foreign Application Priority Data

Jul. 1, 1991 [DE] Germany .............................. 4121716.0

[51] Int. Cl.$^6$ .............................. B32B 7/12; B32B 13/12; B32B 27/40

[52] U.S. Cl. .......................... 428/350; 8/115.6; 8/115.67; 8/DIG. 11; 427/389.9; 427/393.3; 428/295.1; 428/297.4; 428/308.4; 428/349; 428/355 N; 428/423.1; 428/423.5; 428/423.7; 428/913; 428/920; 442/89

[58] Field of Search .............................. 8/115.6, 115.67, 8/DIG. 11; 428/311.1, 423.1, 423.5, 423.7, 913, 920, 308.4, 297.4, 295.1, 350, 349, 355 N; 427/389.9, 393.3; 442/89

[56] References Cited

U.S. PATENT DOCUMENTS

| | | | |
|---|---|---|---|
| 3,953,566 | 4/1976 | Gore ........................................ | 264/288 |
| 4,194,041 | 3/1980 | Gore et al. .............................. | 428/315 |
| 4,400,498 | 8/1983 | Konishi et al. .......................... | 528/80 |
| 4,489,176 | 12/1984 | Kluth et al. .............................. | 528/76 |
| 4,532,316 | 7/1985 | Henn ........................................ | 528/59 |
| 4,594,286 | 6/1986 | McKinney et al. ..................... | 428/245 |
| 4,661,542 | 4/1987 | Gilch et al. .............................. | 528/76 |
| 4,758,648 | 7/1988 | Rizk et al. ................................ | 528/76 |
| 4,780,520 | 10/1988 | Rizk et al. ................................ | 528/76 |
| 4,963,636 | 10/1990 | Mülhaupt et al. ....................... | 528/76 |
| 5,143,995 | 9/1992 | Meckel et al. ........................... | 528/76 |
| 5,166,302 | 11/1992 | Werner et al. ........................... | 528/76 |
| 5,389,430 | 2/1995 | Yilgor et al. ............................. | 428/246 |
| 5,441,808 | 8/1995 | Anderson et al. ....................... | 428/349 |
| 5,461,122 | 10/1995 | Yilgor et al. ............................. | 525/474 |
| 5,521,273 | 5/1996 | Yilgor et al. ............................. | 528/66 |

FOREIGN PATENT DOCUMENTS

| | | |
|---|---|---|
| 0 287 736 | 10/1988 | European Pat. Off. . |
| 0287736 A2 | 10/1988 | European Pat. Off. . |
| 38 15 720 | 11/1989 | Germany . |
| 3815720 A1 | 11/1989 | Germany . |
| 38 27 224 | 2/1990 | Germany . |
| 38 27 224 A1 | 2/1990 | Germany . |
| 38 36 434 | 2/1990 | Germany . |
| 3836434 A1 | 2/1990 | Germany . |
| 39 22 028 | 1/1991 | Germany . |
| 3922028 A1 | 1/1991 | Germany . |
| 40 23 801 | 1/1991 | Germany . |

OTHER PUBLICATIONS

*Webster's II, New Riverside University Dictionary*; The Riverside Publishing Company; 1984; pp. 459 and 1308.

Abstract searched from "Hochmolekularbericht" No. H 6980/61, 1961.

Deutsche Norm "DIN 53866", Nov., 1977.

Prefung Von Textiles, Schrumpfverhalem Von Fasern Und Carmen Begriffe, Dim 53 866 Teil 1, Testing or Textiles; shrinkage of fibres and yarns; Eimspräche bis 30, Nov. 1991; Vorgeschem als Brstax für Ausgabe Mar. 1979.

*Primary Examiner*—Rabon Sergent
*Attorney, Agent, or Firm*—Vidas, Arrett & Steinkraus

[57] ABSTRACT

The present invention relates to polyurethane hot melt adhesives that are hardened by the action of moisture and which contain at least one reaction product from a component that contains NCO groups and an essentially linear hydroxypolyester, hydroxypolyether, and/or hydroxypolyetherester component. In addition, the present invention relates to a procedure for manufacturing a material that is permeable to water only in vapor form, this being in the form of a fiber material, in particular in the form of a web, which is joined to a polyurethane film, in which the fiber material is coated with a polyurethane material and subsequently the polyurethane material is hardened to form a water-vapor permeable film. The present invention also relates to a material that is permeable to water only in vapor form and which is in the form of a fiber material, in particular in the form of a web, that is bonded to a polyurethane film. According to the present invention, a hot melt adhesive with a segmented hydroxypolyester or an hydroxypolyether or an hydroxypolyetherester component is used for this purpose as polyurethane material. The hot melt adhesive according to the present invention can be applied directly or by a transfer technique to the fiber material and is hardened in only one step, by the action of moisture, to form a water-vapor permeable, but otherwise high quality water-proof membrane film.

10 Claims, No Drawings

WATER VAPOR PERMEABLE FILM

This application is a Divisional Application of U.S. patent application Ser. No. 07/906,807 filed Jun. 30, 1992, now U.S. Pat. No. 5,508,371, claiming a priority date of Jul. 1, 1991 from German Utility Patent Application Number P 41 21 716.0-43.

The present invention relates to hot melt adhesive containing at least one reaction product of a component that contains NCO groups, and at least one essentially linear hydroxypolyester component. In addition, the present invention relates to a process for producing a material that is permeable only to water in vapour form, this material being, in particular in the form of a web, the fibre material being bonded on it surface with a polyurethane foil, in which the fibre material is coated with the polyurethane material, the polyurethano material subsequently being hardened to form a foil that is water-vapour permeable. The present invention also relates to a material that is permeable only to water in vapour form and is in the form of a web-like fibre material that is bonded on its surface to a polyurethane foil.

The present invention also contemplates a material that is permeable to water only in vapour form, comprising a fibre material coated with a polyurethane film formed from a hot melt adhesive containing a reaction product of a component that contains an NCO group with a hydroxypolyester, hydroxypolyetherester, and/or a hydroxypolyether component, said polyurethane film being applied to the fibre material as a layer, directly or through a transfer process, and subsequently hardened by the effects of moisture to form a water-vapour permeable film. The present invention further contemplates such a material wherein 1) the polyurethane film is water-proof as measured by DIN 53886 up to and including a test pressure of at least 0.7 bar (7 m water column), 2) the fibre material is either knitted or in the form of a fleece, 3) the material is built up in two layers, one layer consisting of fibre material and the other of the polyurethane film, 4) the material is built up in three or more layers and at least one polyurethane film layer is covered on both sides by layers of fibre material; and 5) the fibre material is a web. In addition, the present invention contemplates the use of such a material in the manufacture of weather-proof clothing and the like.

Materials that permit the passage of water in vapour form but not in liquid form have been produced for a considerable time and are extremely important for the manufacture of weather-proof clothing, as well as for tarpaulins, in the construction industry, and for many other applications in which the water-vapour permeability is desirable.

Such materials can be produced on the basis of fibre materials, which can be either knitted or random-laid materials such as fleeces. Such fibre materials are not only water-vapour permeable per se: they are also water permeable. Up to the present, the desired degree of hygro-stability has been achieved mainly in that a foil that is only water-vapour permeable and which is of synthetic material has been joined to the fibre material. The examples of these known materials are, for example, the GORETEX laminates.

U.S. Pat. No. 39 53 566 describes a textile material to which a porous water-vapour permeable polytetrafluorethylene film has been laminated by using an adhesive.

From DE-OS 38 36 434, it is known that a web of water-vapour permeable foil can be laminated thermally onto textiles by using a spray-on fusion adhesive. According to DE-OS 38 15 720, in place of this, it is possible to laminate a polyurethane film that is preformed from solution or dispersion onto textiles thermally (by welding) from a reversal paper.

However, in many respects it is disadvantageous to join pre-manufactured foils to fibre materials. It requires a number of costly processing steps to join foil and fibre materials. The use of an adhesive to join foil and fibre material entails the disadvantage that this frequently makes the product stiffer. In addition, the adhesive that is used can clog and thus block, the film structure that is essential to achieve water-vapour permeability. Welding a polyurethane film directly onto the fibre material, as described in DE-OS 38 15 720, requires the costly pre-formation of the foil from either solution or dispersion, and, for this reason, it is extremely difficult to do from the technical standpoint.

A first step towards overcoming these problems is described in EP-A2-0 287 736, according to which a water-vapour permeable and water absorbing coating of a special polyurethane oligomer that has been derivatized with acrylate is produced. This oligomer, together with a pre-formed PTFE matrix film, is rolled onto the fibre material and then hardened in two subsequent hardening stages (irradiation hardening and subsequent moisture hardening) and joined to the fibre material.

However, this procedure is still very costly and does not constitute a solution to the problems of the prior art. As was formerly the case, a pre-formed PTFE film has to be used; the simultaneous application of liquid polyurethane material and pre-formed teflon-matrix film, as well as the two subsequent hardening stages, make the procedure very costly.

DE-OS 39 22 028 proposes that material of this type be manufactured in that a layer of adhesive material is applied to a web-like fibre material and joined to the surface of the fibre material by gluing. The adhesive material should be water-vapour permeable but not water-proof, and should, for example, be formed from a hot melt adhesive. The application contains no details as to the type of hot melt adhesive that is to be used in this process.

A very large number of various types of hot melt adhesives are known from the prior art. Usually, these contain a polymer material that essentially determines the cohesion properties of the adhesive, in a mixture with resins or the like that render it adhesive and which are essentially decisive for the adhesion properties. Conventional plastifying components are added to this. All three of these principle components can be of the most varied kinds.

According to the applicant's knowledge, however, it is not possible to form a membrane-like film that is water-vapour permeable and equal to the demands placed on the finished material by a particular application on a fibre layer by using any of the hot melt adhesives described in the prior art, let alone those that are commercially available.

For this reason, it is an important task of the present invention to describe hot melt adhesives that are suitable for producing a water-vapour permeable, membrane-like film on a fibre material in situ, so that the foil component of the material does not have to be pre-formed, the properties of the finished material with respect to water-vapour permeability, water-proof properties, service life, stiffness, etc., being approximately equal to the materials known from the prior art.

It is a further task of the present invention to describe a procedure for the inexpensive and problem-free manufacture of water-vapour permeable materials of this kind and to describe materials that can be manufactured accordingly. The features set out in the independent claims provide a solution to this problem; advantageous developments are defined in the sub-claims.

The hot melt adhesives according to the present invention are, in principle, polyurethane fusion adhesives.

DE-OS 38 27 224 discloses similar hot melt adhesives for bonding metal, glass, wood, ceramic, leather, plastics, and the like.

These known hot melt adhesives consist either wholly or in part of conversion products of components that contain NCO groups, namely, polyfunctional isocyanates (polyisocyanates) and partially crystalline hydroxypolyesters with contents of exclusively aliphatic dicarboxylic acids, of the general formula

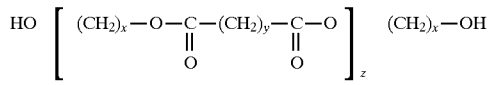

wherein x+y=12 to 26 and, optionally y=8 to 12 or x=6 to 18 and z=3 to 50. The ratio of the reaction of OH:NCO is 1:1.2 to 1:3.0, and preferably 1:1.5 to 1:2.5.

These known hot melt adhesives are intended to achieve a particularly short bonding time in that the partially crystalline polyesters contain decanic diacid, dodecanic diacid, or tetradecanic diacid, with dodecanic diacid being greatly preferred.

It is preferred that the diol component of the polyesters consist of aliphatic $C_6$–$C_{12}$ diols, and, in the case of long-chain dicarboxylic acids, of $C_2$ or $C_4$ diols as well. In addition to these diols, etherdiols can also be contained, preferably those based on ethyleneglycol or butanediol-1,4, which however is not preferred. In no case should the proportion of such ether diols be greater than 50 mol-% of the diol component. According to the embodiments, this does not involve segmenting chain components of the polyester, but components of the monomer mixture that regulate the bonding behaviour.

DE-OS 38 27 224 contains no details about the properties of a film-like formed and hardened hot melt adhesive according to their teachings, and in particular nothing of their porosity, to say nothing of the water-vapour permeability of such a film. Similarly, DE-OS 38 27 224 contains no indication of the use of the hot melt adhesive that they describe to produce water-vapour permeable materials that are, however, water-proof.

The hot melt adhesives found in the prior art are not suitable as such for the purposes of the present invention.

An important advantage of the present invention is the fact that the hot melt adhesive according to the present invention can be applied directly (as well as by a transfer procedure) to a fibre material and processed in situ, in only one hardening stage (namely by the effects of moisture, without being irradiated), to form a membrane-like film that is water-vapour permeable but which, at the same time, displays a considerable degree of hygro-stability. This makes the manufacture of materials according to the present invention extremely simple. For example, the hot melt adhesive according to the present invention can be applied by means of a sheet die to a textile or fleece web when in the molten state, or to a transfer medium (and from this, preferably immediately thereafter, onto the fibre material); after this has been done, the desired membrane film is produced by the simple effect of moisture. Penetration of the hot melt adhesive into the fibre material, and the weight per unit area of the foil that is formed (usually approximately 20 g/m$^2$) can be controlled by a suitable choice of the processing conditions. This very thin membrane-type film does not detract from the properties of the fibre material even though it is bonded to it very strongly. The thinness of the foil, as well as its very low inherent stiffness, contributes to this. Nevertheless, the foil displays hygro-stability, measured according to DIN 53886, up to test pressures of more than 0.7 bar or 7 m static water column.

Hot melt adhesives according to the present invention, in which the component(s) that contain(s) the NCO groups can be caused to react with at least two different components that contain OH groups, namely on the one hand, with an hydroxypolyester and, on the other hand, with an hydroxypolyether, have, according to the applicant's knowledge, no parallel in the prior art. In these reaction products, two urethane functionalities are each connected either by a polyester chain or by a polyether chain, when the sequence of the polymer components in the molecular chain of the reaction product can be statistical. In one variation, the polyester chain can be segmented by inserted polyether groups.

In the other hot melt adhesives according to the present invention in each instance two urethane functionalities are connected by polyester units which, in their turn, are segmented by inserted polyether groups. In the extreme case, the polyester groups can be replaced completely by polyether groups, i.e., the hot melt adhesive then contains a reaction product of a component that contains NCO groups with an essentially linear hydroxypolyether component.

The essential modification of this hot melt adhesive according to the present invention compared to the prior art according to DE-OS 38 27 224 lies in the segmentation of the diol component by the incorporation of polyether groups. It is particularly preferred that the polyester components be modified to form diol molecules by condensing in polyethyleneglycol with gram molecular weights in the range of a few thousand (in the usual manner by fusion condensation in a vacuums.

The particularly preferred polyester components are derived from copolyesters that are characterized as follows: they are built up from aliphatic and from aromatic dicarboxylic acids and diols having a chain length of $C_2$ to $C_{20}$. The OH-number of the polyester group lies between 10 and 50, preferably between 10 and 40; its glass transition temperature is between 0° and −50° C. According to the present invention, these polyesters are modified in that a polyether, preferably polyethyleneglycol with a weight average molecular weight of >1,000, preferably >3,000, is condensed in at a quantity of >10, and preferably >20%-mass.

It is preferred that a polyester obtained on the basis of the product Dynacoll® 7210 obtainable from Hüls AG, which has been modified with 30%-mass PEG 3000 is used.

The copolyester that has been so modified—segmented— can then be caused to react with polyisocyanates, preferably diisocyanates such as, for example, MDI, to form a reactive hot melt adhesive. This isocyanate is, for example, obtainable from Bayer AG under the name "Desmodur 44 M"®. The reaction is effected at a ratio of OH:NCO=1.0:1.6 to 1.0:2.6, and preferably 1.0:1.8 to 1.0:2.4.

In order to adjust the mechanical properties of the hardened product, in particular its tensile strength as well as its impermeability to water, up to 30 parts (relative to 100 parts of the segmented copolyester according to the present invention) of a non-segmented copolyester with a higher glass transition temperature, for example 0° to 50° C., and preferably $T_g$+20 to +40° C. can be added during the reaction with the isocyanate. A preferred example for this is the product Dynacoll® 7140 that can be obtained from Hüls AG.

According to the present invention, hot melt adhesives are manufactured according to the customary process, when the reaction of the hydroxypolyester components according to the present invention and any additional commercially available hydroxypolyester components with the polyisocyanate can be effected simultaneously. In contrast to this, it may be advantageous to react the particular hydroxypolyester separately with the polyisocyanate and then mix the hot melt adhesive from the PU components so obtained.

Even though the above-described hydroxycopolyesters are especially preferred according to the present invention, the hot melt adhesives according to the present invention can also contain other hydroxypolyesters, hydroxypolyether esters, or hydroxypolyethers, e.g., polycaprolactone, polycarbonates, or polytetrahydrofurane.

A hot melt adhesive according to the present invention may be a reaction product of a dihydroxy functional polyester component which contains a segmenting dihydroxy functional polyether component that has a weight average molecular weight of between 100 and no more than 10,000, preferably between 2,000 and 6,000 and in particular of approximately 3,000. The segmenting dihydroxy functional polyether content may suitably be 10%-wt or more, preferably 20 to 95%-wt, and in particular approximately 30%-wt, relative to the total diol constituent of the dihydroxy functional polyester component.

Optionally the diol component of the hot melt adhesive may further contain a dihydroxy functional polyether component having a weight average molecular weight between 100 and 10,000, preferably between 2,000 and 6,000.

The dihydroxy functional polyester component may contain a linear aliphatic dicarboxylic acid residue, preferably a residue of a $C_2$ to a $C_{14}$ dicarboxylic acid and in particular of adipic acid.

The dihydroxy functional polyester component may alternatively be a copolyester that is built up from aliphatic and aromatic dicarboxylic acids and diols having a chain length of $C_2$ to $C_{20}$ and preferably an OH number between 10 and 50, in particular between 20 and 40, and a glass transition temperature between 0° and −50° C.

As a further alternative, the dihydroxy functional polyester component may have a content of an aromatic dicarboxylic acid, preferably of terephthalic acid and/or phthalic acid or isophthalic acid. In one embodiment, the dihydroxy functional polyester component contains approximately equal parts by weight of aliphatic and aromatic dicarboxylic acid. In this embodiment, the aromatic dicarboxylic acid constituent of the dihydroxy functional polyester component may consist of approximately equal parts by weight of terephthalic acid and phthalic acid.

The hot melt adhesive of the present invention may further contain an amorphous, dihydroxy functional polyester component which is formed from isophthalic acid and at least one lower aliphatic diol or polyol, in particular ethylene glycol, hexanediol, and/or neopentylglycol.

An exemplary hot melt adhesive according to the present invention may contain, relative to the total weight, between 50 and 70%-wt of the dihydroxy functional polyester component that has approximately 30%-wt relative to the total diol, of a segmenting dihydroxy functional polyether component having a weight average molecular weight of approximately 3,000; a linear dihydroxy functional polyester that contains no dihydroxy functional polyether component; and approximately 10%-wt diisocyanate. Alternately, the hot melt adhesive may contain, relative to the total weight, between 60 and 65%-wt of a dihydroxy functional polyester formed from a diol and a diacid in which the diol comprises polyethyleneglycol; between 25 and 30%-wt of a dihydroxy functional polyester in which the diol does not comprise polyethylene glycol; between 5 and 15%-wt of diphenylmethane-4,4' diisocyanate; and may optionally contain anti-oxidants and other usual additives. A still further embodiment of the hot melt adhesive of the present invention may contain relative to the total weight, between 20 and 90%-wt of a dihydroxy functional polyether; between 0 and 70%-wt of a linear dihydroxy functional polyester that contains no polyether; between 0 and 70%-wt of a dihydroxy functional polyester that contains polyether; and approximately 10%-wt diisocyanate.

It is advantageous that aliphatic polyisocyanates such as, for example, isophorondiisocyanate, tetramethylxylyldiisocyanate, hydrated MDI and hexanediisocyanate can be used instead of diphenylmethane-4,4'-diisocyanate (MDI).

It is preferred that the hot melt adhesives according to the present invention contain the derivatized hydroxypolyester component according to the present invention (or hydroxypolyetherester or hydroxypolyether component) as well as a commercially available non-derivatized hydroxypolyester component at a ratio of approximately 2:1. Usual additives of anti-oxidants, fillers (for example, flame retardants), pigments, and the like can also be incorporated. There are no restrictions with regard to the fibre materials that can be combined with the hot melt adhesives according to the present invention, neither are there any restrictions with regard to the number of layers or coatings that can be joined to each other and foil that can be formed from hot melt adhesive.

Application of the molten hot melt adhesive to the fibre material or the transfer medium is preferably effected by using a sheet die, for example, the MA 25 sheet die application valve from Macon Klebetechnik, Erkrath. This permits absolutely even coating across the whole of the application width at a constant application rate, even with hot melt adhesive of varied viscosity, and, simultaneously, minimal application weights. No counter-pressure roller is required during application and this makes the manufacture of the materials according to the present invention significantly simpler. At the same time, profiled applications are also possible by using different dosing rates across the application width.

The present invention will be described in greater detail below on the basis of the embodiments described. It is understood that these embodiments only illustrate the work that is done according to the present invention and are not to be understood as being restrictive.

EXAMPLE 1

The hydroxycopolyester component of a hot melt adhesive according to the present invention was manufactured in that a mixture of 70%-mass ethyleneglycol and 30%-mass polyethyleneglycol with a gram molecular weight of 3,000 was subjected to fusion condensation in a vacuum with adipic acid, terephthalic acid, and ortho-phthalic acid (in a weight proportion of approximately 2:1:1).

EXAMPLE 2

In order to manufacture a hot melt adhesive according to the present invention, 280 g (63.3%-wt) of the modified copolyester described in Example 1 was heated to 120° C. with 120 g (27.1%-wt) of commercially available amorphous copolyester with $T_g$=+40° C. (Dynacoll® 7140), and then evacuated for 30 minutes at this temperature. The vacuum was below 1 Torr. Subsequently, 42 g (9.5%-wt) diphenylmethane-4,4'-diisocyanate (Desmodur® 44 MS) was added to it. Subsequently, 0.2 g Irganox® 1010 (an anti-oxidant) was added.

The mixture was heated for 60 minutes at 120° to 130° C. and homogenized. The hot melt adhesive so obtained was then allowed to cool.

EXAMPLE 2a

In order to produce a hot melt adhesive according to the present invention, 75 g (37.5%-wt) of Dynacoll 7130, a commercially available copolyester, 25 g (12.5%-wt) of Dynacoll 7210, a commercially available copolyester, and 23 g (11.5%-wt) of Dynacoll 7381, a commercially available copolyester, were heated to 120° C. and together with 51 g (25.5%-wt) of a polyethyleneglycol with a molecular weight of 3,000 were evacuated for 45 minutes at this temperature. The vacuum was below 1 Torr. Then, 25 g (12.5%-wt) of diphenylmethane-4,4'-diisocyanate (Desmodur 44 MS) were added. Subsequently, 1 g (0.5%-wt) of Irganox 1010 (an anti-oxidant) was added.

EXAMPLE 3

The hot melt adhesive as described in Example 2 was applied at a weight per unit volume of 38 g/m$^2$ to silicon paper using a sheet die application valve MA 25 (Macon Kilebetechnik), and then immediately applied to a fleece fibre web, when it was subsequently hardened by the action of moisture.

EXAMPLE 4

The water-vapour permeability as measured by DIN 53333 was determined using a sample of the material described in Example 3, when, in a deviation from the standard, work was carried out with static air.

The water-vapour permeability was determined to be 99 g/m$^2$.d.

EXAMPLE 5

The water-proof qualities were determined according to DIN 53886 in a water pressure test, using a further sample of the material as described in Example 3. To this end, a seam checker (PFAFF) was used.

According to this standard, the material according to the present invention was water-proof up to a pressure of 0.7 bar (7 m static water column).

The foregoing shows that the present invention permits particularly simple and economical manufacture of water-vapour permeable but otherwise water-proof materials using a simple application stage and a similarly simple hardening stage, and results in materials with outstanding permeability and water-proof qualities.

We claim:

1. Material that is permeable to water only in vapour form, comprising a fibre material coated with a water vapour permeable polyurethane film formed from a hot melt moisture curing adhesive containing at least one isocyanate functional polyurethane consisting essentially of the reaction product of a component that contains NCO groups and a diol component comprising at least one linear dihydroxy polyester, characterized in that the dihydroxy functional polyester is formed from a diacid constiment and a diol constituent, the diol constituent comprising a dihydroxy poplyether that has a weight average molecular weight of at least 1000, thereby providing polyether segmenting of said polyester, and wherein the ratio of OH:NCO in said isocyanate functional polyurethane is between 1.0:1.6 and 1.0:2.6, said water vapor permeable polyurethane film being applied to the fiber material as a layer, directly or through a transfer process while said hot melt adhesive is in a molten state, and subsequently hardened by the effects of moisture to form a water-vapor permeable film. through a transfer process while said hot melt adhesive is in a molten state, and subsequently hardened by the effects of moisture to form a water-vapour permeable film.

2. Material as defined in claim 1, characterized in that the polyurethane film is water-proof as measured by DIN 53886 to a test pressure of at least 0.7 bar (7 m water column).

3. Material as defined in claim 1 characterized in that the fibre material is either knitted or in the form of a fleece.

4. Material as defined in claim 1, characterized in that the material is built up in two layers, one layer consisting of fibre material and the other of the polyurethane film.

5. Material as defined in claim 1, characterized in that the material is built up in three or more layers, at least one polyurethane film layer is covered on both sides by layers of fibre material.

6. The material of claim 1 wherein the fibre material is a web.

7. The material of claim 1 used in the manufacture of weather-proof clothing, tarpaulins and other water-vapour permeable articles.

8. The material of claim 1 wherein the hot melt adhesive has an OH:NCO ratio in the range of 1.0:1.8 to 1.0:2.4.

9. Material that is permeable to water only in vapor form, comprising a fibre material coated with a polyurethane film formed from a hot melt moisture curing adhesive containing a reaction product of a reactant mixture consisting essenitally of:

a) a component that contains NCO groups; and
b) a diol component selected from the group consisting of:
  i) a diol hydroxypolyetherester components;
  ii) a hydroxypolyetherester component and a hydroxypolyether component;
  iii) a hydroxypolyetherester component and a hydroxypolyester component; and
  iv) a hydroxypolyether component and a hydroxypolyester component; and wherein the ratio of OH:NCO is between 1.0:1.6 and 1.0:2.6, said polyurethane film being applied to the fibre material as a layer, directly or through a transfer process while said hot melt adhesive is in a molten state, and subsequently hardened by the effects of moisture to form a water-vapour permeable film.

10. Material that is permeable to water only in vapour form, comprising a fibre material coated with a polyurethane film formed from a hot melt moisture curing adhesive containing a reaction product of a component that contains NCO groups and a diol component comprising at least one linear dihydroxy functional polyester, characterized in that the dihydroxy functional polyester is formed from a diacid constituent and a diol constituent, the diol constituent comprising a dihydroxy polyether that has a weight average molecular weight of at least 1000, thereby providing polyether segmenting of said polyester, and wherein the ratio of OH:NCO in said isocyanate functional polyurethane is between 1.0:1.6 and 1.0:2.6, said polyurethane film being applied to the fibre material as a layer, directly or through a transfer process while said hot melt adhesive is in a molten state, and subsequently hardened by the effects of moisture to form a water-vapour permeable film.

* * * * *

UNITED STATES PATENT AND TRADEMARK OFFICE
CERTIFICATE OF CORRECTION

PATENT NO. : 5,851,661

DATED : 12/22/98

INVENTOR(S) : Harald Werenicz et al

It is certified that error appears in the above-identified patent and that said Letters Patent is hereby corrected as shown below:

Col. 7, line 60, delete "constiment" and insert -- constituent --;

Col. 7, line 62, delete "poplyether" and insert -- polyether --;

Col. 8, line 35, delete "diol hydroxypolyetherester components" and insert

-- "hydroxypolyetherester component --.

Signed and Sealed this

Eighteenth Day of May, 1999

Attest:

Q. TODD DICKINSON

*Attesting Officer*  *Acting Commissioner of Patents and Trademarks*